United States Patent
Yin

(10) Patent No.: US 11,895,554 B2
(45) Date of Patent: Feb. 6, 2024

(54) EDGE SYSTEM AND DATA OPERATION REQUEST PROCESSING METHOD

(71) Applicant: Huawei Cloud Computing Technologies Co., Ltd., Guizhou (CN)

(72) Inventor: Wei Yin, Gui'an (CN)

(73) Assignee: HUAWEI CLOUD COMPUTING TECHNOLOGIES CO., LTD., Guizhou (CN)

(*) Notice: Subject to any disclaimer, the term of this patent is extended or adjusted under 35 U.S.C. 154(b) by 56 days.

(21) Appl. No.: 17/830,573

(22) Filed: Jun. 2, 2022

(65) Prior Publication Data
US 2022/0303718 A1    Sep. 22, 2022

Related U.S. Application Data

(63) Continuation of application No. PCT/CN2020/134345, filed on Dec. 7, 2020.

(30) Foreign Application Priority Data

Dec. 6, 2019   (CN) .......................... 201911242057.1

(51) Int. Cl.
*H04W 4/021*    (2018.01)
*H04L 67/1097*  (2022.01)
(Continued)

(52) U.S. Cl.
CPC .......... *H04W 4/021* (2013.01); *G06F 16/278* (2019.01); *G06F 16/285* (2019.01);
(Continued)

(58) Field of Classification Search
CPC ............. G06F 16/285; G06F 16/24568; G06F 16/278; G06F 16/9537
See application file for complete search history.

(56) References Cited

U.S. PATENT DOCUMENTS

| 9,372,914 B1* | 6/2016 | Asuncion .............. G06F 16/285 |
| 2005/0135257 A1 | 6/2005 | Stephens et al. |

(Continued)

FOREIGN PATENT DOCUMENTS

| CN | 101310267 A | 11/2008 |
| CN | 102088418 A | 6/2011 |

(Continued)

OTHER PUBLICATIONS

Marc Shapiro et al., "Conflict-free Replicated Data Types," HAL, Submitted on Jul. 19, 2011, 22 pages.
(Continued)

*Primary Examiner* — Barbara B Anyan
(74) *Attorney, Agent, or Firm* — Conley Rose, P.C.

(57) ABSTRACT

An edge system includes a plurality of first-layer circles and a second-layer circle, and a geographical area represented by the second-layer circle includes a geographical area represented by each first-layer circle, that is, the first-layer circles are deployed in the second-layer circle. Each first-layer circle includes a plurality of sites, the sites include an initial site and are also included in the second-layer circle, and the initial site processes a data operation request sent by a client in a first-layer circle including the initial site, and in the second-layer circle.

20 Claims, 11 Drawing Sheets

(51) Int. Cl.
  *H04W 8/26* (2009.01)
  *G06F 16/28* (2019.01)
  *G06F 16/27* (2019.01)
  *G06F 16/9537* (2019.01)

(52) U.S. Cl.
  CPC ...... *G06F 16/9537* (2019.01); *H04L 67/1097* (2013.01); *H04W 8/26* (2013.01)

(56) References Cited

U.S. PATENT DOCUMENTS

| | | |
|---|---|---|
| 2006/0206610 A1 | 9/2006 | Ling et al. |
| 2009/0005968 A1* | 1/2009 | Vengroff ............. G06F 16/9537 701/425 |
| 2013/0124525 A1* | 5/2013 | Anderson ............. G06F 16/278 707/737 |
| 2016/0227464 A1 | 8/2016 | Senarath et al. |
| 2017/0303140 A1 | 10/2017 | Li et al. |
| 2018/0058862 A1* | 3/2018 | Dong ................. G01C 21/3889 |
| 2020/0192872 A1* | 6/2020 | Quinn ............... G06F 16/24568 |

FOREIGN PATENT DOCUMENTS

| | | |
|---|---|---|
| CN | 105242881 A | 1/2016 |
| CN | 107211341 A | 9/2017 |
| CN | 108055264 A | 5/2018 |
| CN | 106031198 B | 10/2019 |
| CN | 110740180 A | 1/2020 |
| WO | 2012109188 A1 | 8/2012 |

OTHER PUBLICATIONS

Michael J. Freedman et al., "Sloppy hashing and self-organizing clusters," IPTPS 2003, 6 pages.

* cited by examiner

EDGE SYSTEM AND DATA OPERATION REQUEST PROCESSING METHOD

CROSS-REFERENCE TO RELATED APPLICATIONS

This is a continuation of International Patent Application No. PCT/CN2020/134345 filed on Dec. 7, 2020, which claims priority to Chinese Patent Application No. 201911242057.1 filed on Dec. 6, 2019, which is hereby incorporated by reference in its entirety.

TECHNICAL FIELD

This disclosure relates to the field of computer technologies, and in particular, to an edge system and a data operation request processing method performed by the edge system.

BACKGROUND

With advances in mobile communication technologies, there are increasing low-latency and computationally intensive services, such as virtual reality (VR), augmented reality (AR), and the Internet of vehicles. To reduce a requirement on a client computation power of such services and provide low-latency or even ultra-low-latency services to clients, cloud service providers deploy sites at an edge near a user. Geographic locations of these sites may be highly discrete, and a server cluster in each site is generally not large. However, a quantity of the sites may be relatively large, and a network between the sites is usually not ensured by a private line.

To manage these highly discrete sites, a conventional central management architecture is used, as shown in FIG. 1. In this architecture, after site installation and deployment are started, site information needs to be registered with a central management site, and a site is required to periodically confirm connection survival with the central management site. The central management site needs to deploy a database service to manage information such as a host resource and a tenant resource of each site. Because the information is stored in the central management site, an operation on the information is required for resource provisioning, management, and query required by a cloud service running on a site.

A disadvantage of the central management architecture is that a hub-and-spoke topology with a large fan out has problems that a site management scale is limited and a low latency user request cannot be met. As a quantity of sites increases and geographical dispersion of the sites further expands, the central management architecture becomes a bottleneck of management.

SUMMARY

This disclosure provides an edge system. The edge system implements mobile data following with a design of sites in a plurality of layer circles, which improves processing efficiency of a data operation request and data security.

According to a first aspect, an edge system is provided, where the edge system includes a plurality of first-layer circles and a second-layer circle, and a geographical area represented by the second-layer circle includes a geographical area represented by each first-layer circle. Each first-layer circle includes a plurality of sites, each site is configured to process a data operation request sent by a client, and the plurality of sites include an initial site and are also included in the second-layer circle. The initial site is configured to process the data operation request in a first-layer circle including the initial site and in the second-layer circle because the data operation request is stored both in a specific first-layer circle and in the second-layer circle.

In the foregoing provided edge system, sites in a plurality of layers of circles are designed, and the sites in the plurality of layers of circles intersect each other. These intersecting sites can implement a data operation in each circle, so that data can still be secure and reliable, and data access efficiency can be ensured when the data is moved between different first-layer circles.

In a possible implementation, when the data operation request is a write request, the initial site is configured to address, in the first-layer circle including the initial site, a target site corresponding to target data carried in the data operation request, and send the target data to the target site in the first-layer circle including the initial site, and address, in the second-layer circle, a target site corresponding to the target data, and send the target data to the target site in the second-layer circle. The target site in the first-layer circle including the initial site is configured to store the target data. The target site in the second-layer circle is configured to store the target data.

In a case of a write request, the initial site writes the target data in both the first-layer circle and the second-layer circle, so that when the client subsequently accesses the target data in the same first-layer circle, the client can efficiently acquire the target data in a site in the first-layer circle. In addition, when the client accesses the target data after the client moves to another first-layer circle, the original first-layer circle and the first-layer circle to which the client moves belong to one second-layer circle, and the target data stored in the second-layer circle may be used to provide a service for the client, thereby ensuring security and reliability of accessing the data by the client.

In a possible implementation, the target site in the first-layer circle including the initial site is further configured to create or update a copy of the target data on another site in the first-layer circle including the initial site.

In a possible implementation, the target site in the second-layer circle is further configured to create or update a copy of the target data on another site in the second-layer circle.

Security of the target data is improved by implementing the copy of the target data in a circle of each layer.

In a possible implementation, when the data operation request is a read request, the initial site is configured to address, in the first-layer circle including the initial site, a target site corresponding to a key of target data carried in the data operation request, the target site in the first-layer circle including the initial site is configured to determine whether the target data is stored locally on the target site in the first-layer circle including the initial site, and if the target data is stored locally on the target site in the first-layer circle including the initial site, send the target data to the client, or if the target data is not stored locally on the target site in the first-layer circle including the initial site, address, in the second-layer circle, a target site corresponding to the key of the target data, and the target site in the second-layer circle is configured to determine that the target data is stored locally on the target site in the second-layer circle, and send the target data to the client.

In a case of a read request, as described in the foregoing, a first attempt is made to search for the target data in a first-layer circle that is relatively close to the client. If the target data cannot be found, the second-layer circle is searched for the target data, thereby balancing efficiency and security of a data operation.

In a possible implementation, the target site in the second-layer circle is further configured to send the target data to the target site in the first-layer circle including the initial site.

The target data is sent to the target site in the first-layer circle including the initial site, so that when the target data is subsequently accessed in the first-layer circle including the initial site, the target data can be directly found in the first-layer circle including the initial site, thereby improving working efficiency.

According to a second aspect, a data operation request processing method is provided, where the data operation request is a write request, the data operation request processing method is applied to an edge system, the edge system includes a plurality of first-layer circles and a second-layer circle, and a geographical area represented by the second-layer circle includes a geographical area represented by each first-layer circle. Each first-layer circle includes a plurality of sites, each site is configured to process a data operation request sent by a client, and the plurality of sites include an initial site and are also included in the second-layer circle. The initial site addresses, in a first-layer circle including the initial site, a target site corresponding to target data carried in the data operation request, the initial site sends the target data to the target site in the first-layer circle including the initial site, the target site in the first-layer circle including the initial site stores the target data, the initial site addresses, in the second-layer circle, a target site corresponding to the target data, and sends the target data to the target site in the second-layer circle, and the target site in the second-layer circle stores the target data.

An action of performing addressing, by the initial site, in the first-layer circle including the initial site and an action of performing addressing, by the initial site, in the second-layer circle may be performed in parallel.

In a possible implementation, the method further includes creating or updating, by the target site in the first-layer circle including the initial site, a copy of the target data on another site in the first-layer circle including the initial site.

In a possible implementation, the method further includes creating or updating, by the target site in the second-layer circle, a copy of the target data on another site in the second-layer circle.

According to a third aspect, a data operation request processing method is provided, where the data operation request is a read request, the data operation request processing method is applied to an edge system, the edge system includes a plurality of first-layer circles and a second-layer circle, and a geographical area represented by the second-layer circle includes a geographical area represented by each first-layer circle, each first-layer circle includes a plurality of sites, each site is configured to process a data operation request sent by a client, and the plurality of sites include an initial site and are also included in the second-layer circle. The initial site addresses, in a first-layer circle including the initial site, a target site corresponding to a key of target data carried in the data operation request, the target site in the first-layer circle including the initial site determines whether the target data is stored locally on the target site in the first-layer circle including the initial site, and if the target data is stored locally on the target site in the first-layer circle including the initial site, sends the target data to the client, or if the target data is not stored locally in the target site in the first-layer circle including the initial site, addresses, in the second-layer circle, a target site corresponding to the key of the target data, and the target site in the second-layer circle determines that the target data is stored locally on the target site in the second-layer circle, and sends the target data to the client.

In a possible implementation, the method further includes sending, by the target site in the second-layer circle, the target data to the target site in the first-layer circle including the initial site.

An action of sending, by the target site in the second-layer circle, the target data to the target site in the first-layer circle including the initial site and an action of sending, by the target site in the second-layer circle, the target data to the client may be performed in parallel.

According to a fourth aspect, a non-transient readable storage medium is provided. When instructions stored in the non-transient readable storage medium are executed by each site system on an edge, the system executes the methods provided in the third aspect, the possible implementations of the third aspect, the fourth aspect, and the possible implementations of the fourth aspect. The storage medium stores program instructions. The storage medium includes but is not limited to a volatile storage device, for example, a random-access storage device, and a non-volatile storage device, for example, a flash storage device, a hard disk drive (HDD), and a solid-state drive (SSD).

According to a fifth aspect, a computer program product is provided. When instructions included in the computer program product are executed by an edge system, the system performs the methods provided in the third aspect, the possible implementations of the third aspect, the fourth aspect, and the possible implementations of the fourth aspect. The computer program product may be a software installation package. When the method provided in the first aspect and the possible implementations of the first aspect needs to be used, the computer program product may be downloaded, and the instructions included in the computer program product may be executed on each site of the edge system.

BRIEF DESCRIPTION OF DRAWINGS

To describe the technical methods in some of the embodiments of this disclosure more clearly, the following briefly describes the accompanying drawings for describing embodiments.

DESCRIPTION OF EMBODIMENTS

The following describes the technical methods in embodiments of this disclosure with reference to the accompanying drawings in embodiments of this disclosure.

Figure 1:
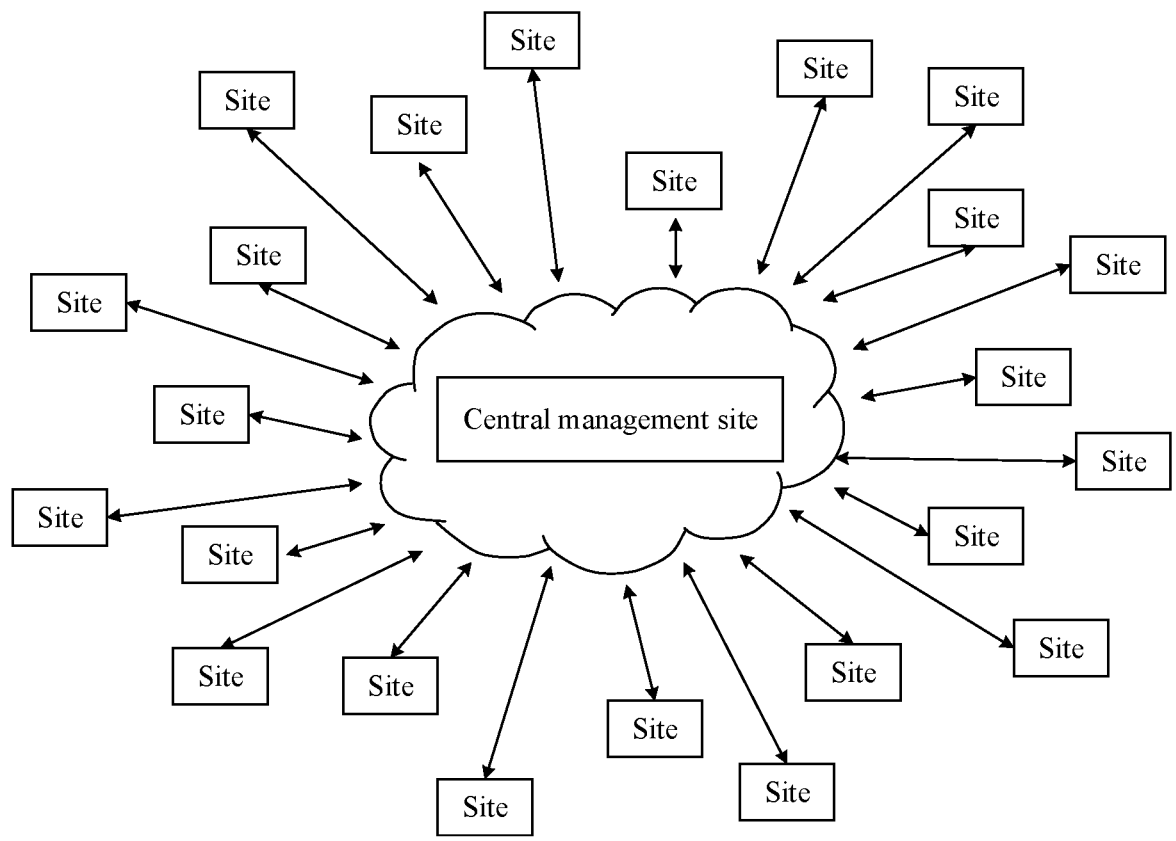
FIG. 1 is a schematic diagram of a structure of an edge system according to this disclosure.
Figure 2:
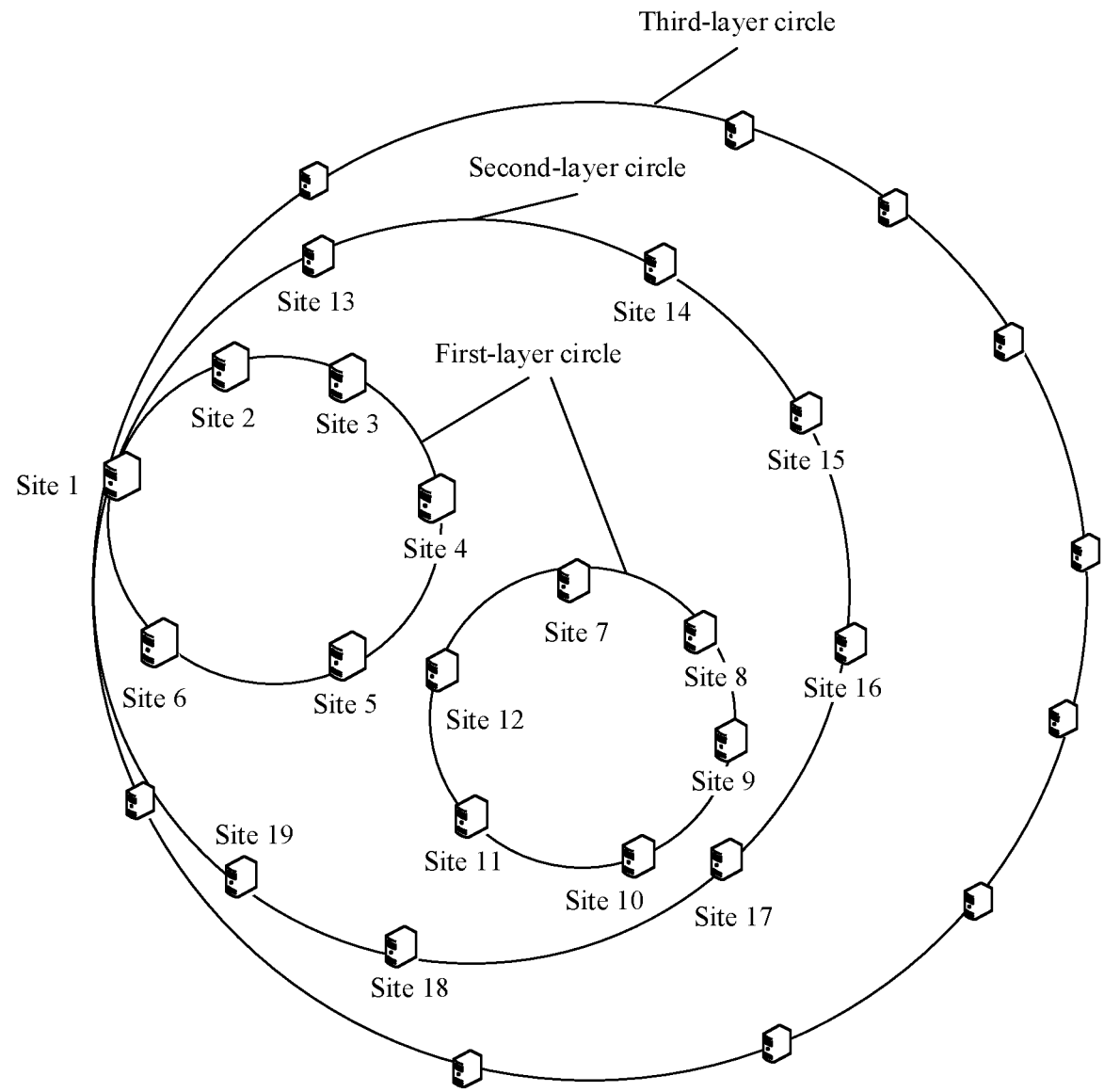
FIG. 2 is another schematic diagram of a structure of an edge system according to this disclosure.

As shown in FIG. 2, this disclosure provides an edge system. The edge system includes a plurality of sites. The edge system includes a plurality of layers of circles. The edge system may have one or more circles of a same layer. Each site may belong to a plurality of circles of different layers at the same time, and each site cannot belong to a plurality of circles of a same layer at the same time. Only a portion of the edge system is shown in FIG. 2, and other possible apparatuses, such as an edge gateway of the edge system, are omitted.

In general, different circles represent different geographical areas. A higher-layer circle represents a larger geographical area, and a lower-layer circle represents a smaller geographical area. Different circles of a same layer represent different geographical areas of the same layer. A geographical area represented by each high-layer circle includes at least one low-layer circle. For example, a third-layer circle represents a country, a second-layer circle represents a province, and a first-layer circle represents a city. In this case, a geographical area represented by the third-layer circle includes at least one second-layer circle, and a geographical area represented by each second-layer circle includes at least one first-layer circle. A site in the high-layer circle belongs to a low-layer circle included in the geographical area represented by the high-layer circle. For example, a site 1 in the third-layer circle belongs to a second-layer circle included in the third-layer circle, and the site 1 also belongs to a first-layer circle included in the second-layer circle. Sites 13 to 19 in FIG. 2 actually belong to a first-layer circle, and each site included in the third-layer circle also actually belongs to a second-layer circle and a first-layer circle. A site in each circle belongs to one addressing domain, such as a hash domain. For example, sites 1 to 6 belong to one first-layer addressing domain, sites 7 to 12 belong to another first-layer addressing domain, and sites 1 and 13 to 19 belong to a second-layer addressing domain. This is described in detail below.

Physical areas in which sites are deployed in a higher-layer circle are more dispersed, and therefore, a latency of providing a service to a client is higher. For example, a latency of a site in the third-layer circle responding to a request of the client is 50 milliseconds (ms), a latency of a site in the second-layer circle responding to a request of the client is 20 ms, and a latency of a site in the first-layer circle responding to a request of the client is 10 ms. Therefore, the edge system uses as far as possible a site in a low-layer circle close to the client to respond to a request of the client.

The client may be a hardware terminal, for example, a computer or a mobile phone, or a software module running on the hardware terminal. The client generates a data operation request, for example, a read request/write request based on a service requirement, and sends the data operation request to the edge system to perform an operation on data stored in the edge system. The data operation request includes information such as a key and an operator of target data. The target data is an operation object of the data operation request, and the key is information such as an access path and an access address of the target data.

Each site includes at least one running unit, and each running unit is one physical computer or one virtual machine. Modules included in each site may run in a distributed manner on running units included in the site. When the site includes a plurality of running units, the plurality of running units may store each piece of target data in a distributed manner, and each running unit stores a part of the target data (a fragment of the target data). The plurality of running units includes one metadata server. When the site includes a plurality of running units, the site described below is actually the metadata server. A communication network between sites and a communication network between the site and the client may be a wired communication network, or may be a wireless communication network, for example, a fifth-generation mobile communication technology (5G) system, or a Long-Term Evolution (LTE) system, and WI-FI.

Figure 3:
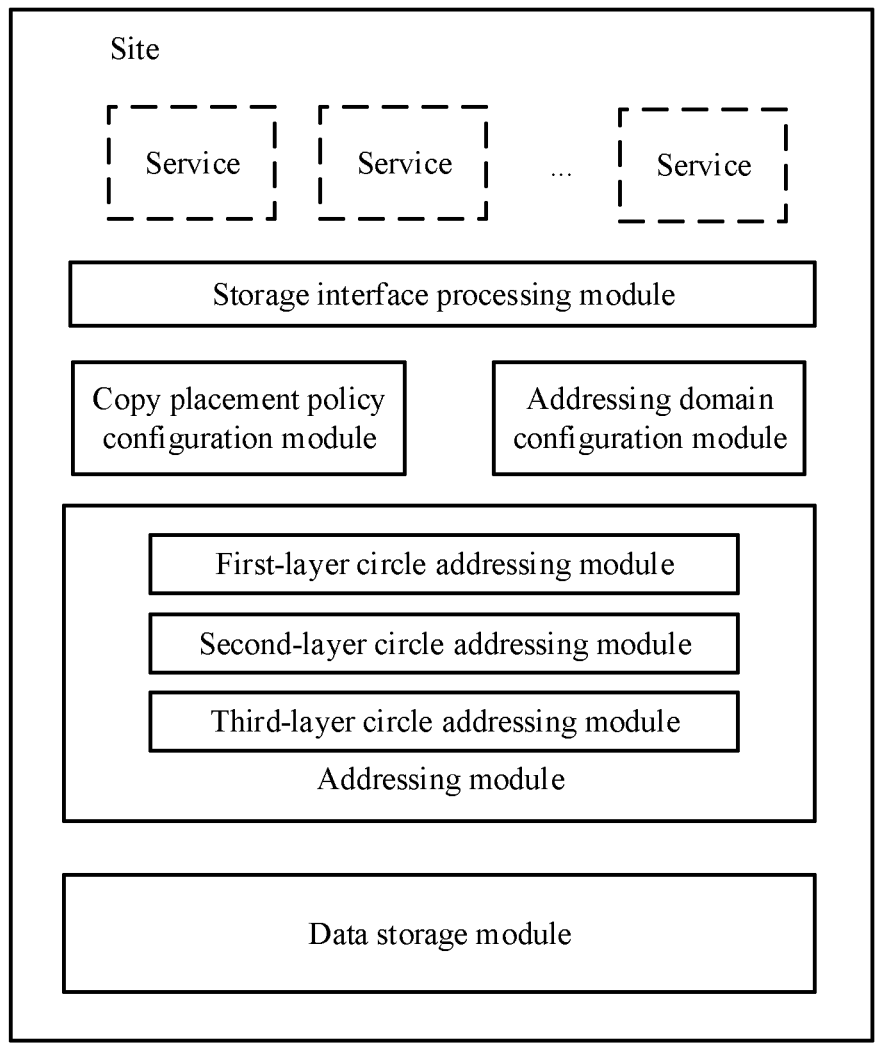
FIG. 3 is a schematic diagram of a structure of an edge site according to this disclosure.

As shown in FIG. 3, a site includes a data storage module configured to actually store data. The data storage module further stores metadata, and the metadata records a correspondence between a key of the data and a storage address of the data. For example, the data storage module uses object storage. In this case, the metadata records a correspondence between a key of the data and an address of a bucket in which the data is located.

The site further includes an addressing module, and the addressing module is configured to, after the site receives a data operation request, perform addressing, based on the data operation request, in a circle in which the site is located. When the site belongs to a plurality of circles, the addressing module includes a plurality of circle addressing modules, and each circle addressing module manages one addressing domain. When a low-layer circle addressing module cannot address, in the current circle, a site on which the target data is located, a high-layer circle addressing module continues to perform addressing in a high-layer circle. The site 1 in FIG. 2 is used as an example. The site 1 belongs to a first-layer circle, a second-layer circle, and a third-layer circle at the same time. Therefore, after the site 1 receives a data operation request, a first-layer circle addressing module performs addressing in the first-layer circle. If a site on which the target data is located cannot be found in the first-layer circle, a second-layer circle addressing module performs addressing in the second-layer circle. If a site on which the target data is located still cannot be found in the second-layer circle, a third-layer circle addressing module performs addressing in the third-layer circle. A specific addressing algorithm used by the addressing module is described later.

The site further includes a storage interface processing module configured to receive the data operation request, parse the data operation request, and send a parsed parameter to a module requiring the parameter.

The site further includes a copy placement policy configuration module configured to configure a copy placement policy of data that is written/modified based on the data operation request. For example, in a same circle, synchronous processing is performed between copies, in three copies in a same circle, synchronous processing is performed between two copies and asynchronous processing is performed for one copy, and asynchronous processing is performed between copies in a low-layer circle and a high-layer circle.

The site further includes an addressing domain configuration module configured to create, modify (when a site is added) each addressing domain, that is, configure the addressing domain module.

Optionally, the site may further run various services, for example, a database service and various applications. In one case, when the client accesses the edge system, the client may consider the edge system as a storage system, and directly send a data operation request to an edge gateway of the edge system, and the edge gateway sends the data operation request to a storage interface processing module of a site. In this case, the site may not need to run various services.

In another case, a service runs on a site. A database service is used as an example. The client considers the edge system as a database service, and the client sends a database service call request to an edge gateway, and the edge gateway sends the service call request to a database service that runs on a site. After executing the database operation request, the database service generates a data operation request corresponding to the database operation request, and sends the data operation request to a storage interface processing module.

In the edge system, the target data of the data operation request may be stored in a site in a low-layer circle or a site in a high-layer circle. The addressing algorithm in the edge system is described below (that is, how to find a site on which the target data is located).

The data operation request generated by the client is sent to an initial site, and an addressing module in the initial site first performs addressing in an addressing domain of a lowest-layer circle in which the initial site is located. Further, an addressing algorithm in the addressing domain may perform addressing by using a flexible routing table, a distributed hash table, and the like. Alternatively, an addressing module of each site may directly record metadata of data stored on each site in a circle, and the addressing module of the initial site may directly find a site on which the target data is located. This case is also referred to as a full mesh. In the full mesh case, because the addressing module needs to record a large quantity of metadata, a large storage space is occupied. In addition, when target data stored on any site is modified, metadata of the addressing module of each site needs to be modified synchronously, which causes relatively large communication consumption. Therefore, the full mesh is suitable for a circle that has a relatively small scale. When a circle has a relatively large scale and a quantity of sites in the circle is relatively large, a manner of a distributed hash table may be used for addressing. Alternatively, a manner of a flexible routing table is further used for addressing.

The following describes an addressing algorithm in an addressing domain of a circle by using a distributed hash table as an example. First, each piece of data stored in the circle is represented as one key-value (KV) pair, where the value is an Internet Protocol (IP) address of a site storing the data (or other description information of the site). These KV pairs form an index table of the data stored in the circle. The index table is split and distributed to each site in the circle according to a specific rule, so that each site is responsible for maintaining a part of the index table therein. Then, a site on which target data is located is constantly approached by continuously forwarding a data operation request between sites.

Figure 4:
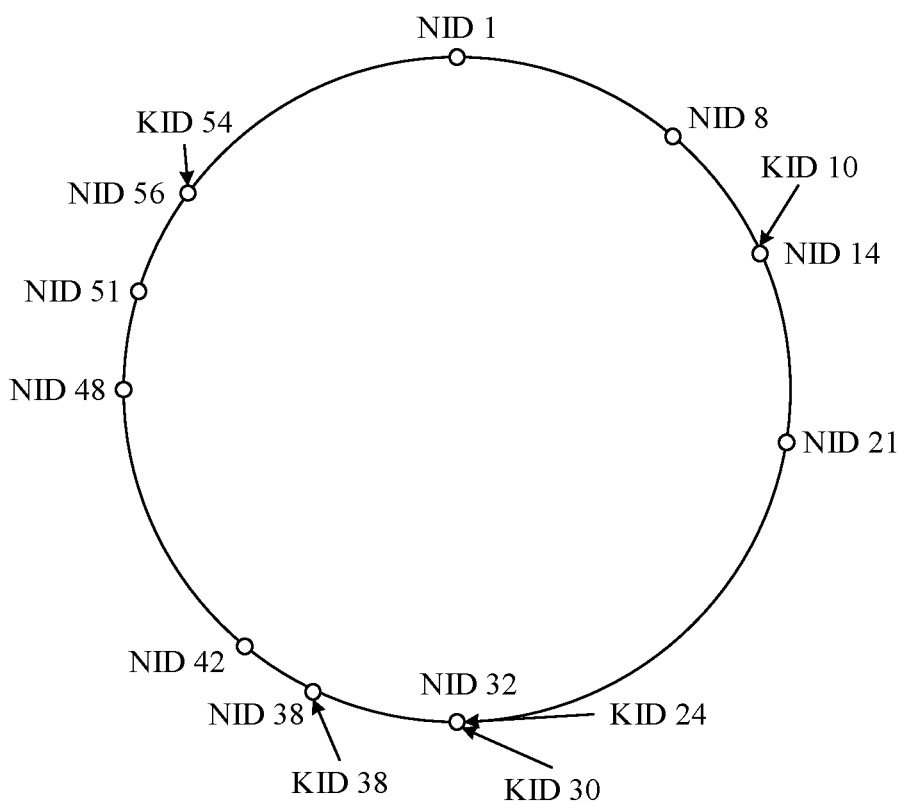
FIG. 4 is a schematic diagram of a structure of a hash ring of an addressing algorithm according to this disclosure.

An implementation of the distributed hash table is described by using the Chord algorithm as an example. Chord ensures consistent hashing by mapping a site and a key to a same space. First, a $2^m$ space is generated by using a hash function ($2^m$ is not less than a maximum node identifier (NID)). Integers in the space are connected head to tail to form a ring, which is referred to as a Chord ring. Each point on the Chord ring is referred to as an identifier. If a site is mapped to an identifier, the identifier is referred to as a node. According to a clockwise direction on the Chord ring, a node located in front of a node is referred to as a predecessor node thereof, and a node located behind a node is referred to as a successor node thereof. The first predecessor node is referred to as a direct predecessor node, and the first successor node is referred to as a direct successor node. After a site is hashed to the Chord ring, an NID may be obtained. The NID is obtained by performing a hash operation on an IP address of the site. After a key is hashed to the Chord ring, a key identifier (KID) may be obtained. The KID is obtained by performing a hash operation on the key. NIDs are placed clockwise on the Chord ring in ascending order. Data corresponding to each KID is allocated to a site whose NID≥KID for storage. As shown in FIG. 4, for a Chord ring with m=6, there are 10 NIDs and five KIDs. Data corresponding to KID 10 is allocated to NID 14 for storage, data corresponding to KID 24 and KID 30 is allocated to NID 32 for storage, data corresponding to KID 38 is allocated to NID 38 for storage, and data corresponding to KID 54 is allocated to NID 56 for storage.

A routing table (or a finger table) with a maximum of m entries is maintained on each NID for addressing. A routing table of one NID at least contains locations ending with a location of NID+$2^{(m-1)}$. Based on the example shown in FIG. 4, referring to FIG. 5, in FIG. 5, a KID is denoted as K and an NID is denoted as N for simplification. A left column of a routing table of N8 contains locations from N8+1 to N8+32, and a right column contains an actual site corresponding to each of the locations. For example, the first row (that is, a correspondence between N8+1 and N14) indicates that N14 is responsible for data at the first location after N8, and the second row (that is, a correspondence between N8+2 and N14) indicates that N14 is responsible for data at the second location after N8. Another row has a similar meaning. Therefore, a routing table of each node contains only a small part of node information. The routing table of each node records more about a location for which an adjacent successor node is responsible. For example, N8 records three pieces of data for which N14 is responsible, and records only one piece of data for which N21 is responsible. When a resource is searched for on a node, it is first determined whether a successor node of the node owns the resource. If the successor node of the node does not own the resource, searching directly starts from a farthest entry in a routing table of the node to see which entry is closest to a node holding data, and an addressing request is sent to the node. If the successor node of the node owns the resource, it indicates that the node itself has the resource to be searched for. In this way, iteration is performed.

Figure 5:
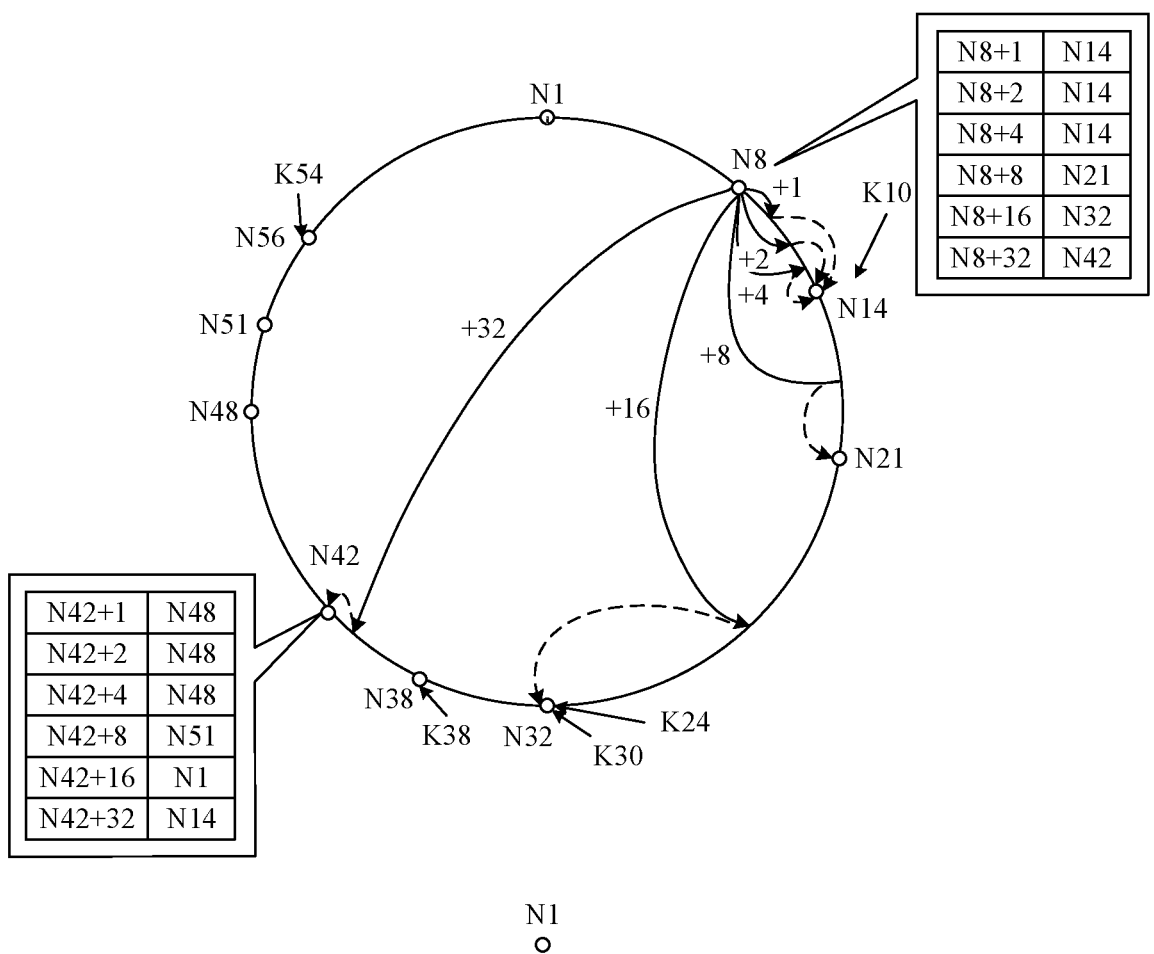
FIG. 5 is another schematic diagram of a structure of a hash ring of an addressing algorithm according to this disclosure.
Figure 6:
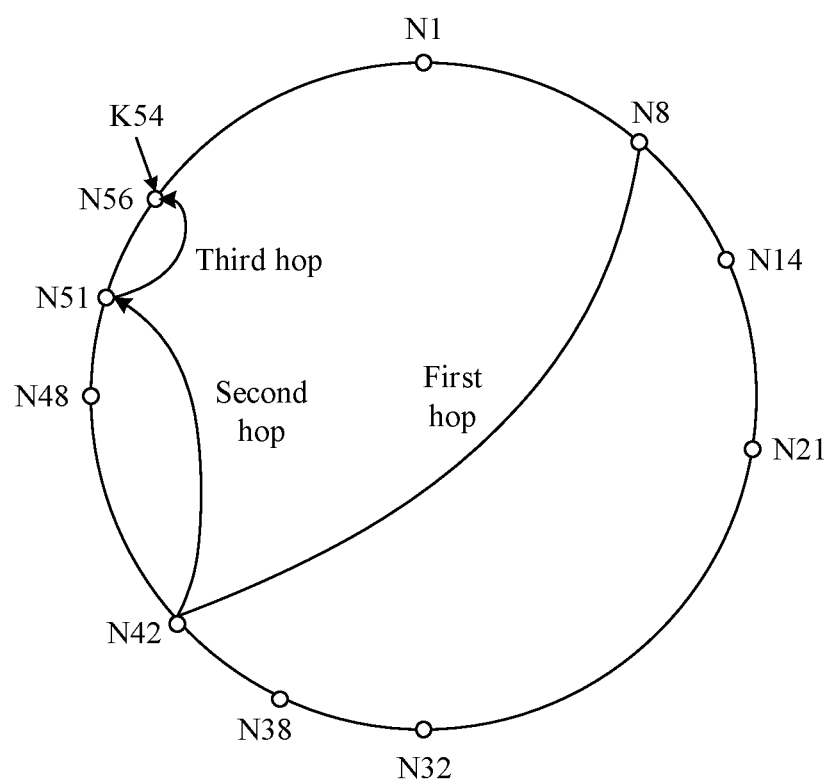
FIG. 6 is another schematic diagram of a structure of a hash ring of an addressing algorithm according to this disclosure.

For example, referring to FIG. 5 and FIG. 6, data corresponding to K54 is searched for on N8. First, it is found in the routing table of N8 that a successor node is N14, it is found that K54 does not meet a requirement of 54∈(8;14], then the routing table of N8 is searched for an entry that meets the requirement (searching from far to near, that is, searching upwards from the bottom of the routing table by using FIG. 5 as an example), and it is found that a farthest entry, N8+32→N42 in the routing table, meets a requirement of 42∈(8;54]. This indicates that N42 is closest to a node that holds the data corresponding to K54. Therefore, jump to N42 to continue searching (the first hop). According to a routing table of N42, it can be learned that a successor node of N42 is N48, which does not meet a requirement of 54∈(42;48]. This indicates that N48 does not hold the data corresponding to K54. Therefore, searching starts in the routing table of N42. Searching starts from far to near in the routing table of the N42 node, it is found that N42+8→N51 meets a requirement of 51∈(42;54]. This indicates that N51 is closest to a node that holds the data corresponding to K54. Then, jump to the N51 node to continue searching (the second hop). A successor node of the N51 node is N56, which meets a requirement of 54∈(51;56]. Therefore, addressing is completed. A data query request of KID 54 is sent to a site corresponding to NID 51 for processing (the third hop).

When a new site is added, the Chord ring needs to be refreshed accordingly. The new site forms a new node on the Chord ring, and a routing table of each node is also updated accordingly.

If a client originally stores data in a first-layer circle (for example, a Wuhan city circle), where the first-layer circle belongs to a second-layer circle (for example, a Hubei province circle), after the client moves to another first-layer circle, when the client attempts to access the data in the first-layer circle to which the client moves, an addressing module of each site in the first-layer circle to which the client moves finds that no site that stores the data can be addressed in the circle.

To avoid this situation and ensure mobile data following of the client, when operating data in a lower-layer circle, the client synchronizes the data to a higher-layer or much higher-layer circle. In this way, when the client moves to another first-layer circle, although no site that stores target data can be addressed in the other first-layer circle, if the first-layer circle in which the client is originally located and the first-layer circle to which the client moves belong to a same second-layer circle, when the client cannot address the target data in the first-layer circle to which the client moves, the client can address the target data in the second-layer circle, and read the target data to a site in the first-layer circle to which the client moves for subsequent access. Even if the first-layer circle in which the client is originally located and the first-layer circle to which the client moves do not belong to a same second-layer circle, the first-layer circle in which the client is originally located and the first-layer circle to which the client moves belong to a higher-layer circle. When the client cannot address the target data in the first-layer circle to which the client moves, the client can address the target data in the higher-layer circle, and read the target data to a site in the first-layer circle to which the client moves.

The following separately describes implementation processes of an edge system provided in this disclosure by using a data operation request as a write request and a read request.

Figure 7A:
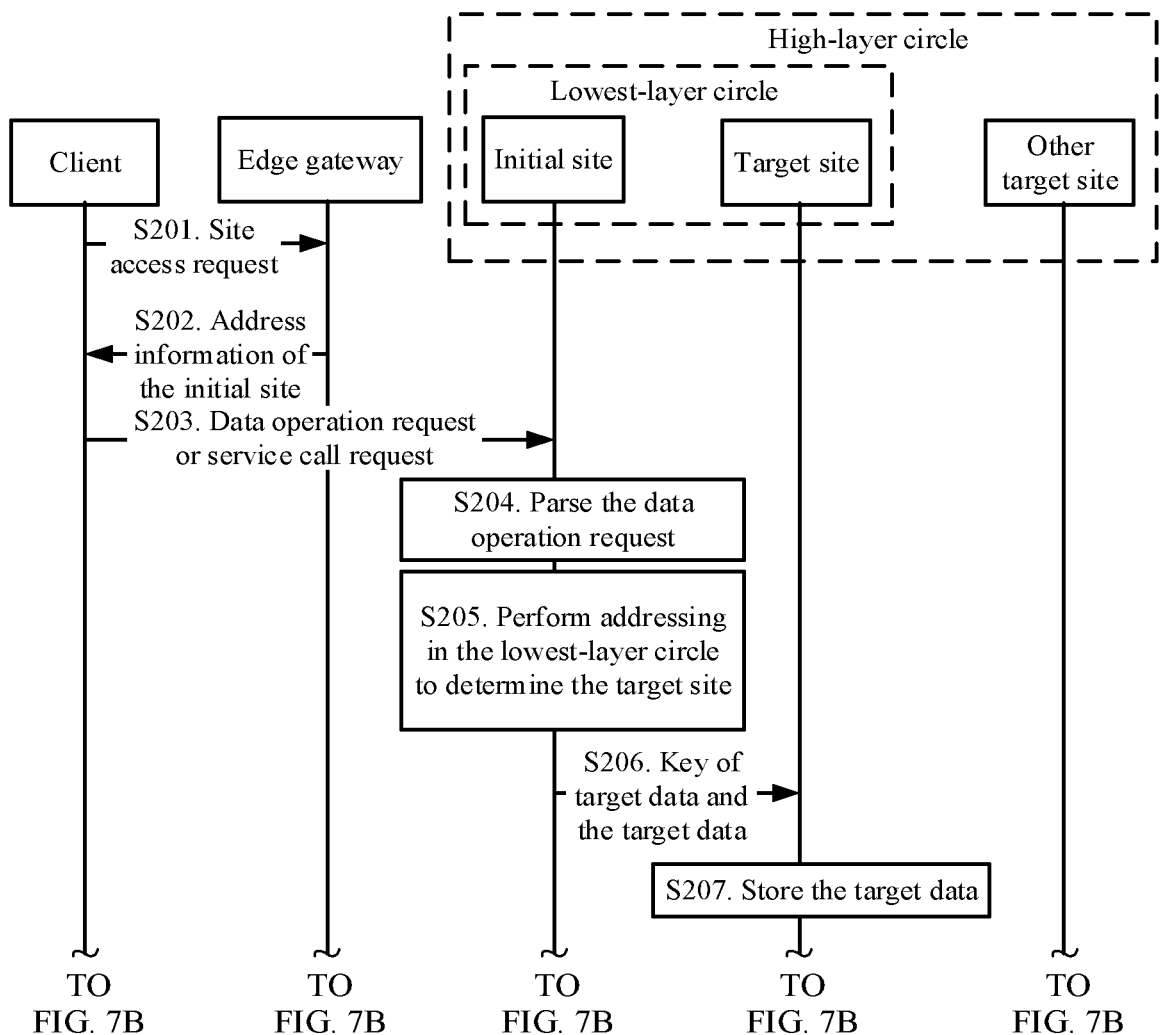
FIG. 7A and FIG. 7B are a flowchart of processing a data operation request according to this disclosure.
Figure 7B:
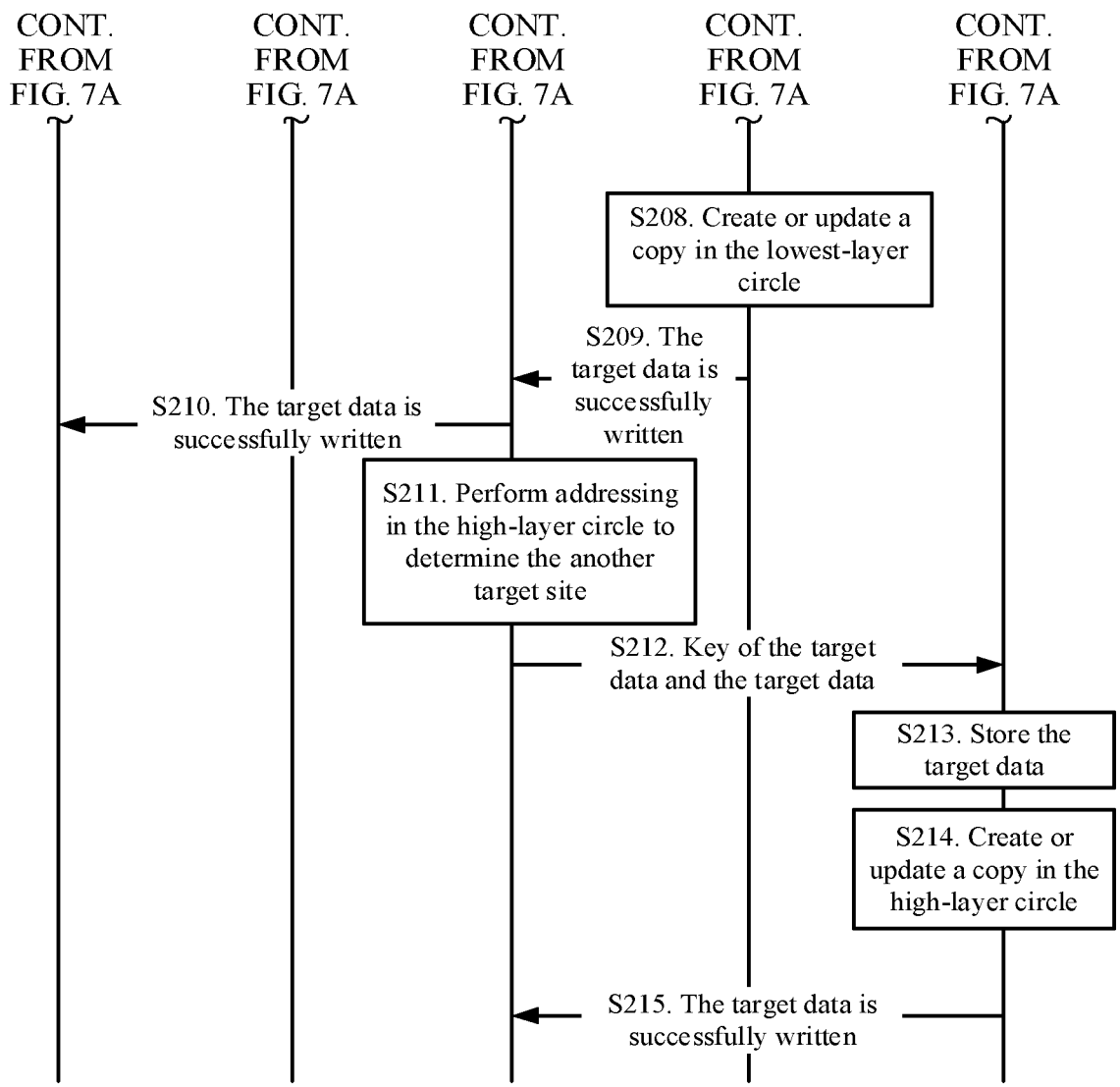

When the data operation request is a write request, FIG. 7A and FIG. 7B show a process in which the edge system processes the data operation request.

S201. A client requests to send a site access request to an edge gateway, to request address information of a site.

Commonly, the client communicates with the edge gateway through a Hypertext Transfer Protocol (HTTP)/HTTP Secure (HTTPS) protocol, and the client accesses the edge gateway through a domain name of the edge system. In this case, the edge gateway may be a domain name server (DNS). The edge gateway selects an initial site for the client based on one or more parameters such as a latency between the client and each site, a workload of each site, and a physical distance between the client and each site.

S202. The edge gateway sends address information of a selected initial site to the client.

S203. As described above, the client may send a data operation request or a service call request (when a direct purpose of the client is to call a service running on the site) to the initial site.

S204. The initial site obtains the data operation request, and parses the data operation request by using a storage interface processing module.

In S203, when the client sends a service call request, a service running on the initial site generates a data operation request based on the service call request.

The data operation request includes a key of target data and the target data. Optionally, the data operation request may further include circle information, and the circle information may include default, or indicate a circle of a specific layer.

Default: indicates that a site completes, based on a preset manner in a copy placement policy configuration module, writing target data and creating or updating a copy in a lowest-layer circle in which the site is located, and simultaneously completes writing the target data and creating or updating a copy in a high-layer circle, to implement mobile data following. Specific high-layer circles to implement data following can be configured.

Specified layer: indicates that a site writes target data only in a specified-layer circle. A manner of writing the target data may also be completing, based on the preset manner in the copy placement policy configuration module, writing the target data and creating or updating a copy in the specified-layer circle.

When the specified layer is used, it indicates that data written at this time gives up mobile data following. Therefore, the target data does not need to be written to a high-layer circle.

The following continues to describe the processing process of the data operation request by using the circle information as default.

S205. A lowest-layer circle addressing module of the initial site performs addressing, based on the key of the target data, in the lowest-layer circle in which the initial site is located, and determines a target site corresponding to the key of the target data.

The initial site is usually a site relatively close to the client, and is not a site that is specified in an addressing domain and that is responsible for storing the target data. Therefore, the initial site needs to determine, based on the key of the target data, a target site in an addressing domain in which the lowest-layer circle is located. The algorithm in FIG. 4 is still used as an example. It is assumed that the initial site is a site corresponding to NID 8. If KID 40 is obtained after the key of the target data is hashed, KID 40 should be stored in a site corresponding to NID 42 on the hash ring shown in FIG. 6. In this case, the site corresponding to NID 8 needs to send the target data to the site corresponding to NID 42 for storage.

If the initial site is exactly the target site, S206 does not need to be performed after S205.

S206. The initial site sends the key of the target data and the target data to the target site.

After the target site is determined, the initial site determines address information of the target site based on an index table recorded by the initial site. The initial site sends the key of the target data and the target data to the target site based on the address information of the target site.

S207. The target site stores the target data.

The target site stores the target data, and the target site updates locally-recorded metadata and records a correspondence between the key of the target data and a storage address of the target data.

S208. The target site creates or updates a copy in a lowest-layer circle based on a preset manner in a copy placement policy configuration module. If the target data is newly-written data, the target site creates a copy of the target data on another site in the lowest-layer circle. If the target data overwrites existing data, the target site updates a copy of the existing data on another site in the lowest-layer circle. A specific update manner may be synchronous processing of all copies, synchronous processing of some copies and asynchronous processing of some copies, or the like.

After determining that S208 is successfully performed, the target site determines that the write at this time is successful.

S209. The target site notifies the initial site that the target data is successfully written.

S210. The initial site notifies the client that the target data is successfully written.

If circle information carried in the data operation request is a specified layer, a processing process of the data operation request is described in S205 to S210, and only the lowest-layer circle in S205 to S210 needs to be replaced with a specified-layer circle.

If the circle information carried in the data operation request indicates default, after S208, a subsequent process further needs to be performed.

The copy placement policy configuration module indicates that when copies in circles of different layers are processed asynchronously, S209 may be performed in parallel with a subsequent step, that is, S210 can be performed without needing to wait for completion of copy processing in a high-layer circle. When the copy placement policy configuration module indicates that copies in circles of different layers are processed synchronously, S210 needs to wait for completion of copy processing in a high-layer circle before being performed, that is, S210 can be performed only after it is confirmed in S209 and S215 that the write is successful.

S211. The high-layer circle addressing module of the initial site performs addressing, based on the key of the target data, in a high-layer circle in which the initial site is located, and determines, in the high-layer circle, another target site corresponding to the key of the target data.

If in S205, a first-layer circle addressing module of the initial site determines the target site, in S211, a second-layer circle addressing module of the initial site continues to search for another target site in the second-layer circle.

Generally, another target site determined in a high-layer circle is a site that is in an addressing domain of the high-layer circle and is responsible for storing the target data.

S212. The initial site sends the key of the target data and the target data to the other target site in the high-layer circle.

S213. The other target site stores target data.

The other target site stores the target data, and the other target site updates locally-recorded metadata and records a correspondence between the key of the target data and a storage address of the target data.

S214. The other target site creates or updates a copy in the high-layer circle based on the preset manner in the copy placement policy configuration module. S214 is performed similarly to S208. A difference lies in that S208 is an operation performed by the target site on the copy in the lowest-layer circle, and S214 is an operation performed by the other target site on the copy in the high-layer circle.

S215. The other target site notifies the initial site that the write is successful.

When the initial site belongs to a plurality of high-layer circles, S211 to S215 may be performed in parallel for a plurality of rounds, so as to extend to a higher-layer circle each time. When S211 to S215 are performed for the first time, the target data is written into a second-layer circle, and when S211 to S215 are performed for the second time, the target data is written into a third-layer circle, and so on until the target data is written into the highest-layer circle in which the initial site is located.

For example, in S205, the first-layer circle addressing module of the initial site determines the target site, and in S211, the second-layer circle addressing module of the initial site continues to search for another target site in the second-layer circle and perform S212 to S215. In parallel, a third-layer circle addressing module of the initial site continues to search for another target site in the third-layer circle and perform S212 to S215. In this way, the target data is synchronized in a plurality of high-layer circles, so that the client can still access the target data when the client subsequently moves in a larger area.

If the initial site does not belong to a high-layer circle, the initial site may send the target data and the key of the target data to another site that is in the lowest-layer circle and that belongs to a high-layer circle to perform S211.

Figure 8A:
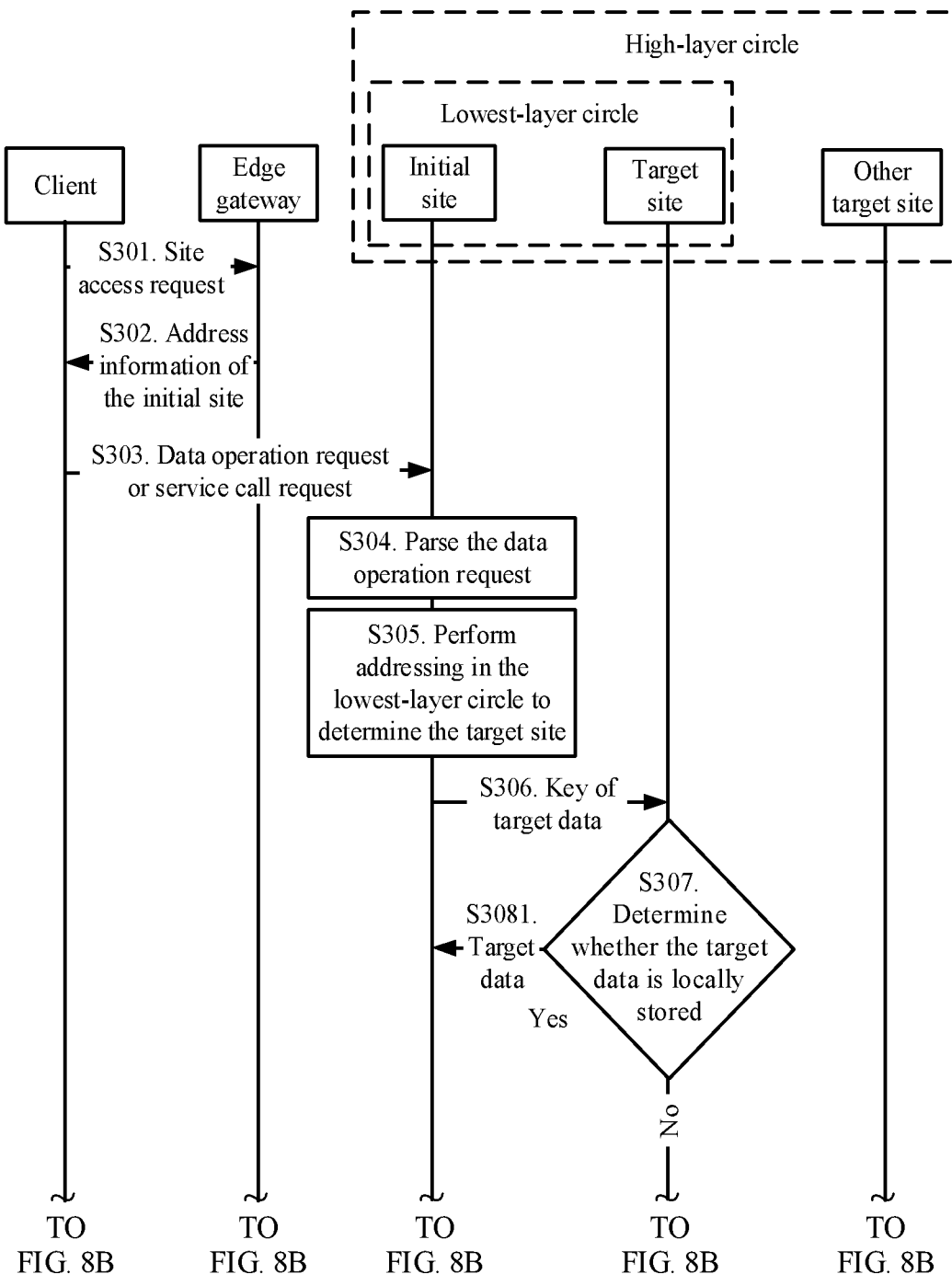
FIG. 8A and FIG. 8B are another flowchart of processing a data operation request according to this disclosure.
Figure 8B:
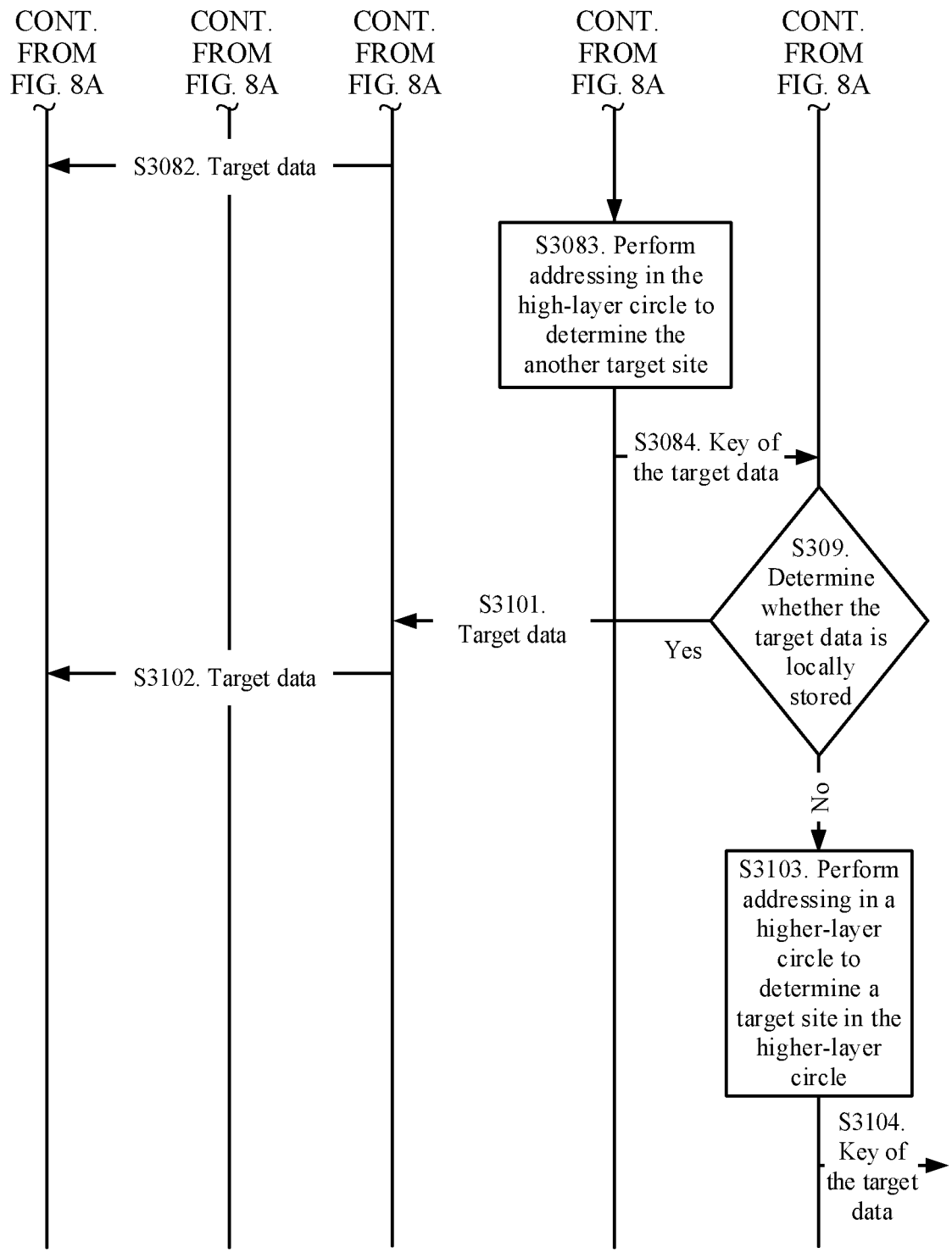

When the data operation request is a read request, FIG. 8A and FIG. 8B show a process in which the edge system processes the data operation request.

S301. A client requests to send a site access request to an edge gateway, to request address information of a site.

Same as S201, the edge gateway selects an initial site for the client.

S302. The edge gateway sends address information of a selected initial site to the client.

S303. The client may send a data operation request or a service call request (when a direct purpose of the client is to call a service running on the site) to the initial site.

S304. The initial site obtains the data operation request, and parses the data operation request by using a storage interface processing module.

In S303, when the client sends the service call request, the service running on the initial site generates a data operation request based on the service call request.

The data operation request includes a key of target data. Optionally, the data operation request may further include circle information, and the circle information may include default, or indicate a circle of a specific layer.

Default: indicates that a site addresses, starting from a lowest-layer circle, a site on which the target data is located. If the site on which the target data is located cannot be determined in the lowest-layer circle, a site on which the target data is located is addressed in a high-layer circle.

Specified layer: indicates that a site addresses, only in a circle of a specified layer, a site on which the target data is located.

Generally, when circle information carried in a data operation request when the target data is written (S203) indicates default, circle information carried in a data operation request when the target data is subsequently read (S303) also indicates default. When the circle information carried in the data operation request when the target data is written (S203) indicates a specified layer, the circle information carried in the data operation request when the target data is subsequently read (S303) also indicates a specified layer.

The following continues to describe the processing process of the data operation request by using the circle information as default.

S305. A lowest-layer circle addressing module of the initial site performs addressing, based on the key of the target data, in a lowest-layer circle in which the initial site is located, and determines a target site corresponding to the key of the target data.

S306. The initial site sends the key of the target data to the target site.

After the target site is determined, the initial site determines address information of the target site based on an index table recorded by the initial site. The initial site sends the key of the target data to the target site based on the address information of the target site.

S307. The target site determines whether the target data is stored locally.

The target site queries local metadata based on the key of the target data and determines whether the target data is stored locally on the target site.

If the target data is stored on the target site, S3081 and S3082 are performed.

S3081. The target site sends the target data to the initial site.

S3082. The initial site sends the target data to the client.

In S3081, alternatively, the target site may directly send the target data to the client, and S3082 is omitted.

If the target data is not stored on the target site, S3083, S3084, and a subsequent step are performed.

S3083. A high-layer circle addressing module of the target site performs addressing, based on the key of the target data, in a high-layer circle in which the target site is located, and determines another target site corresponding to the key of the target data.

S3084. The target site sends the key of the target data to the other target site.

S309. The other target site determines whether the target data is stored locally.

The other target site queries local metadata based on the key of the target data and determines whether the target data is stored locally on the other target site.

If the target data is stored on the other target site, S3101 and S3102 are performed.

S3101. The other target site sends the target data to the initial site.

S3102. The initial site sends the target data to the client.

In S3101, alternatively, the other target site may directly send the target data to the client, and S3102 is omitted.

If the target data is not stored on the other target site, S3103, S3104, and a subsequent step are performed.

S3103. A higher-layer circle addressing module of the other target site performs addressing, based on the key of the target data, in a high-layer circle in which the target site is located, and determines, in a higher-layer circle, a target site corresponding to the key of the target data.

S3104. The other target site sends the key of the target data to another target site in a high-layer circle.

S307 to S3084 may be repeatedly performed for a plurality of times in a process of extending from a low-layer circle to a high-layer circle, and the first repeated process is shown above (S309 to S3104). For example, in S305, a first-layer circle addressing module of the initial site performs addressing in a first-layer circle, in S3083, a second-layer circle addressing module of the target site performs addressing in a second-layer circle, and in S3103, a third-layer circle addressing module of the other target site performs addressing in a third-layer circle.

If the target site of the lowest-layer circle in which the initial site is located does not belong to a high-layer circle, the target site of the lowest-layer circle may send the key of the target data to another site that is in the lowest-layer circle and that belongs to a high-layer circle to perform S3083.

In a process of repeatedly querying the target data from a low-layer circle to a high-layer circle, if the target data is found on a target site in any circle, query of the target site in a higher-layer circle is stopped, and the data may be stored in a target node in a lowest-layer circle, so that the target data can be read subsequently. If the target data still cannot be queried in the highest-layer circle, a target site in the highest-layer circle notifies the initial site that the query of the target data fails.

S3083 and S3084 (S3103 and S3104) may be performed by the target site (the other target site) or by the initial site. When some optimized addressing algorithms, such as a distributed sloppy hash table (DSHT), are applied, the target site (the other target site) can faster find a target site in a higher-layer circle (with fewer hops) by performing the steps.

If the circle information carried in the data operation request is a specified layer, the processing process of the data operation request is described in S305 to S307 (the lowest-layer circle is replaced with a specified-layer circle). After S307, if the target data is stored on a target site in the specified-layer circle, S3081 and S3082 are performed. If the target data is not stored on the target site in the specified-layer circle, the target site in the specified-layer circle notifies the initial site that the query of the target data fails.

Figure 9:
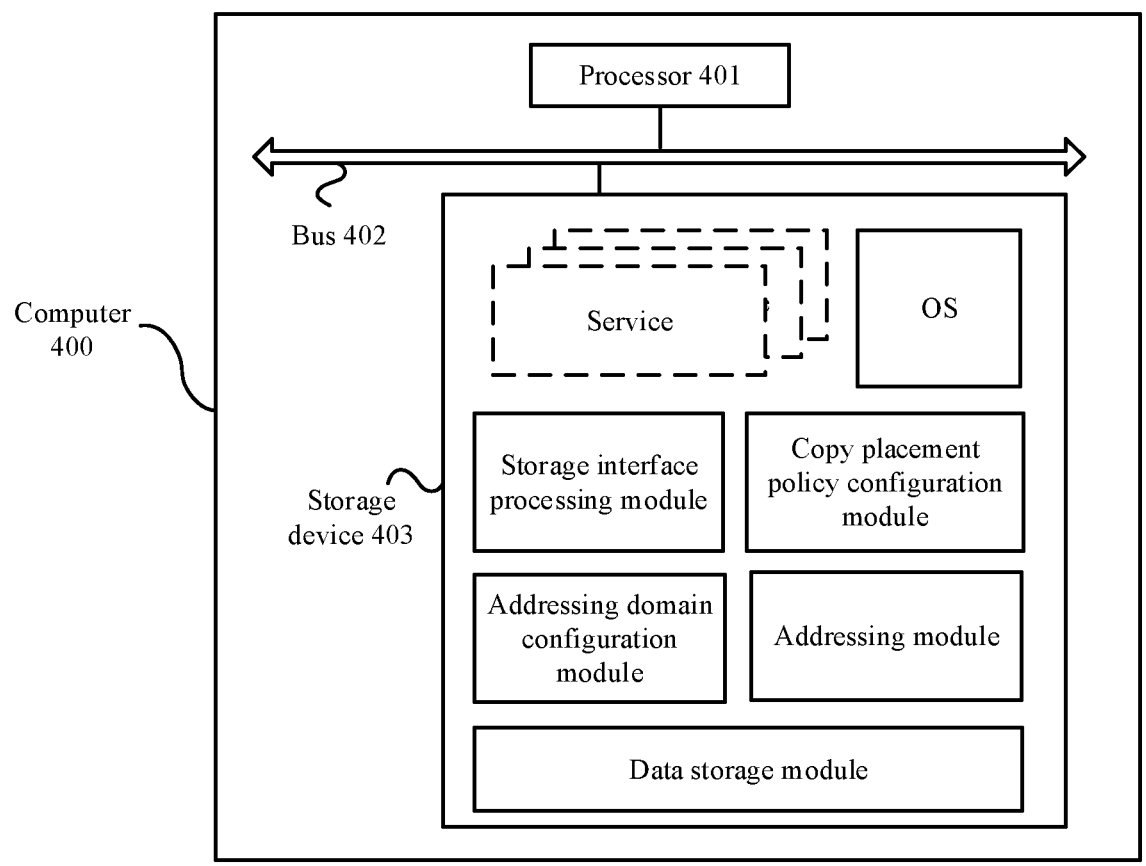
FIG. 9 is a schematic diagram of a structure of a computer according to this disclosure.

FIG. 9 provides a computer 400, and each site is implemented by one or more computers 400. When a running unit in the site is a physical server, the running unit is the computer 400. When the running unit in the site is a virtual machine, the running unit is a virtual machine running on the computer 400.

The computer 400 includes a bus 402, a processor 401, and a storage device 403. The processor 401 communicates with the storage device 403 by using the bus 402. The processor 401 may be a central processing unit (CPU). The storage device 403 may include a volatile memory, such as a random-access memory (RAM), or a non-volatile memory, such as a read-only memory (ROM), or a flash memory, an HDD, or an SSD.

The storage device 403 stores executable instructions, and the processor 401 executes the executable instructions to execute the storage interface processing module, the addressing domain configuration module, the addressing module, the data storage module, and the service (optional) in FIG. 3. The storage device 403 may further include executable instructions required to run an operating system (OS). The OS may be LINUX™, UNIX™, WINDOWS™, or the like.

A description of a procedure corresponding to each of the accompanying drawings has a focus. For a part that is not described in detail in a procedure, refer to a related description of another procedure.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some of the procedures or functions according to embodiments of the present disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital tenant line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), or a semiconductor medium (for example, an SSD).

What is claimed is:

1. An edge system comprising:
a plurality of first-layer circles of sites, each of the plurality of first-layer circles of sites comprising a processor and a storage device storing instructions, wherein each of the first-layer circles of sites represents a first geographical area, wherein each of the first-layer circles of sites comprises a plurality of first sites, wherein each of the first sites is configured to process data operation requests from a client, and wherein the first sites comprise an initial site; and
a second-layer circle of sites representing a second geographical area, each of the plurality of second-layer circle of sites comprising a processor and a storage device storing instructions,
wherein the second geographical area comprises the first geographical area,
wherein the first sites are further comprised in the second-layer circle of sites, and
wherein the initial site is configured to process a data operation request in a first first-layer circle of sites comprising the initial site and in the second-layer circle of sites.

2. The edge system of claim 1, wherein the first first-layer circle of sites further comprises a first target site corresponding to target data carried in the data operation request, wherein the second-layer circle of sites further comprises a second target site corresponding to the target data, wherein the data operation request is a write request, and wherein the initial site is further configured to:
communicate with the first target site;
send the target data to the first target site;
communicate with the second target site data; and
send the target data to the second target site;
wherein the first target site is configured to store the target data, and
wherein the second target site is configured to store the target data.

3. The edge system of claim 2, wherein the first first-layer circle of sites further comprises a second site, and wherein the first target site is further configured to create a copy of the target data on the second site.

4. The edge system of claim 2, wherein the second-layer circle of sites further comprises a second site, and wherein the second target site is further configured to create a copy of the target data on the second site.

5. The edge system of claim 2, wherein the first first-layer circle of sites further comprises a second site, and wherein the first target site is further configured to update a copy of the target data on the second site.

6. The edge system of claim 2, wherein the second-layer circle of sites further comprises a second site, and wherein the second target site is further configured to update a copy of the target data on the second site.

7. The edge system of claim 1, wherein the first first-layer circle of sites further comprises a first target site corresponding to a key of target data carried in the data operation request, wherein the second-layer circle of sites further comprises a second target site corresponding to the key, wherein the data operation request is a read request, wherein the initial site is further configured to communicate with the first target site, and wherein the first target site is configured to:
determine whether the target data is stored locally on the first target site;
send the target data to the client when the target data is stored locally on the first target site; and
communicate with the second target site when the target data is not stored locally on the first target site,
wherein the second target site is configured to:
determine that the target data is stored locally on the second target site; and
send the target data to the client.

8. The edge system of claim 7, wherein the second target site is further configured to send the target data to the first target site.

9. The edge system of claim 1, further comprising an edge gateway coupled to the initial site and configured to receive a site access request from the client.

10. The edge system of claim 9, wherein the edge gateway is further configured to send, in response to receiving the site access request, address information of the initial site to the client.

11. A data operation request processing method implemented by an edge system, wherein the data operation request processing method comprises:
communicating, by an initial site, with a first target site that is corresponding to target data carried in a data operation request of a client and that is in a first-layer circle of sites comprising the initial site, wherein the edge system comprises a plurality of first-layer circles of sites and a second-layer circle of sites, wherein a second geographical area represented by the second-layer circle of sites comprises a first geographical area represented by each of the first-layer circle of sites, wherein each of the first-layer circle of sites comprises a plurality of first sites, wherein each of the first sites is configured to process the data operation request, wherein the first sites comprise the initial site, and wherein the first sites are further comprised in the second-layer circle of sites;
sending, by the initial site, the target data to the first target site;
storing, by the first target site, the target data;
communicating, by the initial site, with a second target site that is corresponding to the target data and that is in the second-layer circle of sites;
sending, by the initial site, the target data to the second target site; and
storing, by the second target site, the target data.

12. The data operation request processing method of claim 1, further comprising creating, by the first target site, a copy of the target data on a second site in the first-layer circle of sites comprising the initial site.

13. The data operation request processing method of claim 11, further comprising creating, by the second target site, a copy of the target data on a second site in the second-layer circle of sites.

14. The data operation request processing method of claim 11, further comprising updating, by the first target site, a copy of the target data on a second site in the first-layer circle of sites comprising the initial site.

15. The data operation request processing method of claim 11, further comprising updating, by the second target site, a copy of the target data on a second site in the second-layer circle of sites.

16. The data operation request processing method of claim 11, further comprising receiving, by an edge gateway of the edge system coupled to the initial site, a site access request from the client.

17. The data operation request processing method of claim 16, further comprising sending, by the edge gateway in response to receiving the site access request, address information of the initial site to the client.

18. A data operation request processing method implemented by an edge system, wherein the data operation request processing method comprises:
communicating, by an initial site, with a first target site that is corresponding to a key of target data carried in a data operation request of a client and that is in a first-layer circle of sites comprising the initial site, wherein the edge system comprises a plurality of first-layer circles of sites and a second-layer circle of sites, wherein a second geographical area represented by the second-layer circle of sites comprises a first geographical area represented by each of the first-layer circles of sites, wherein each of the first-layer circles of sites comprises a plurality of first sites, wherein each of the first sites is configured to process the data operation request, wherein the first sites comprise the initial site, and wherein the first sites are further comprised in the second-layer circle of sites;
determining, by the first target site, whether the target data is stored locally on the first target site;
sending, by the first target site, the target data to the client when the target data is stored locally on the first target site;
communicating with a second target site that is corresponding to the key and that is in the second-layer circle of sites when the target data is not stored locally on the first target site;
determining, by the second target site, that the target data is stored locally on the second target site; and
sending, by the second target site, the target data to the client.

19. The data operation request processing method of claim 18, further comprising sending, by the second target site, the target data to the first target site.

20. The data operation request processing method of claim 18, further comprising:
receiving, by an edge gateway of the edge system coupled to the initial site, a site access request from the client; and
sending, by the edge gateway in response to receiving the site access request, address information of the initial site to the client.

* * * * *

UNITED STATES PATENT AND TRADEMARK OFFICE
CERTIFICATE OF CORRECTION

| | | |
|---|---|---|
| PATENT NO. | : 11,895,554 B2 | Page 1 of 1 |
| APPLICATION NO. | : 17/830573 | |
| DATED | : February 6, 2024 | |
| INVENTOR(S) | : Wei Yin | |

It is certified that error appears in the above-identified patent and that said Letters Patent is hereby corrected as shown below:

In the Claims

Claim 12, Column 16, Line 53: "claim 1" should read "claim 11"

Signed and Sealed this
Second Day of April, 2024

Katherine Kelly Vidal
*Director of the United States Patent and Trademark Office*